Figure 1:
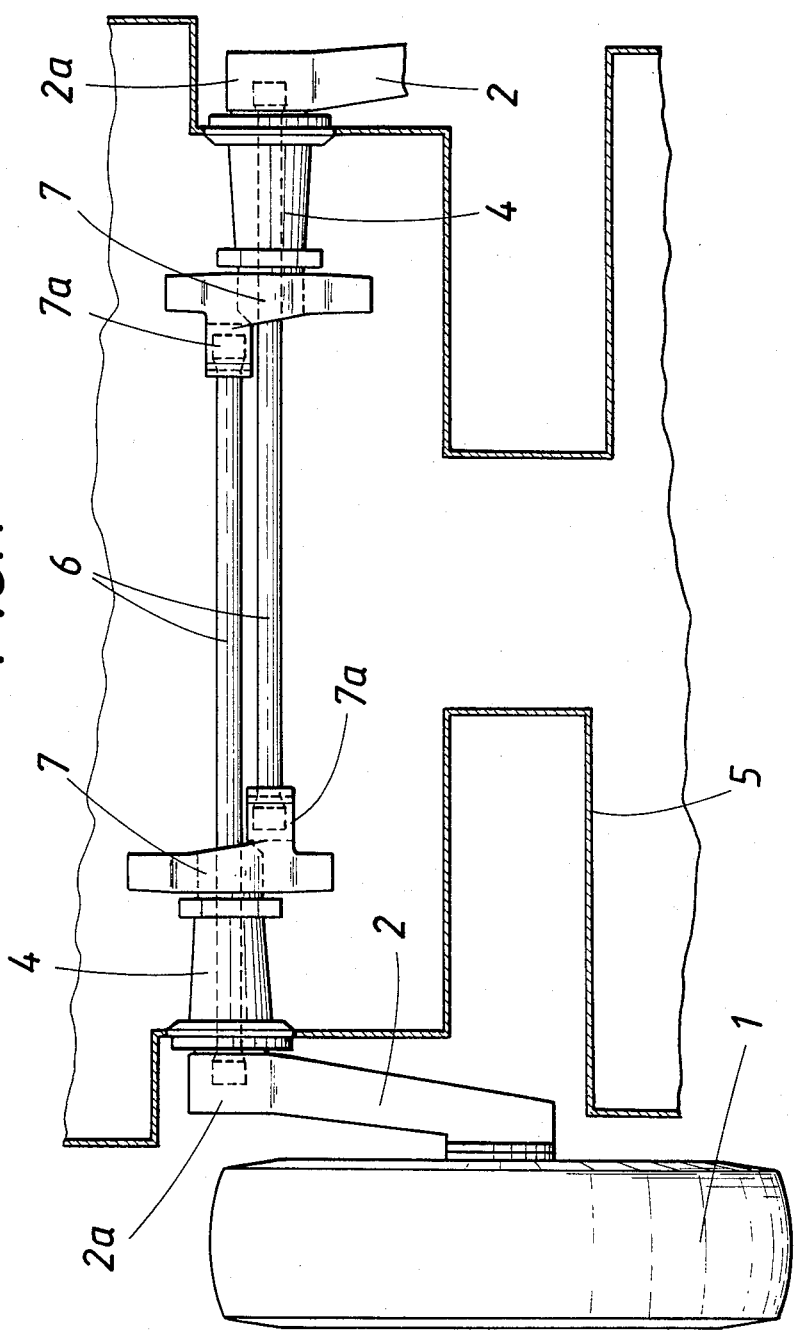

United States Patent [19]

Lenhard-Backhaus et al.

[11] Patent Number: 4,521,033
[45] Date of Patent: Jun. 4, 1985

[54] ASSEMBLY COMPRISING A FRAME, UNSTEERED WHEELS AND SPRING SUSPENSION OF A MOTOR VEHICLE

[75] Inventors: Hugo Lenhard-Backhaus, Vienna; Kurt Krumpeck, Schützen, both of Austria

[73] Assignee: Steyr-Daimler-Puch Aktiengesellschaft, Vienna, Austria

[21] Appl. No.: 491,383

[22] Filed: May 4, 1983

[30] Foreign Application Priority Data

May 11, 1982 [AT] Austria ................................. 1835/82

[51] Int. Cl.$^3$ ............................................ B60G 11/20
[52] U.S. Cl. ..................................... 280/700; 267/57; 280/664; 280/723
[58] Field of Search ............... 280/700, 723, 721, 664, 280/788; 267/57, 11 R

[56] References Cited

U.S. PATENT DOCUMENTS

| 2,082,509 | 6/1937 | Rabe | 267/57 |
| 2,254,261 | 9/1941 | Best | 280/723 |
| 2,606,759 | 8/1952 | Colby | 280/723 |
| 3,037,762 | 6/1962 | Axtmann et al. | 267/11 R |
| 3,117,800 | 1/1964 | Magnuson | 267/57 |
| 3,402,940 | 9/1968 | Castelet | 280/723 |

FOREIGN PATENT DOCUMENTS

| 602724 | 9/1934 | Fed. Rep. of Germany . |
| 602797 | 9/1934 | Fed. Rep. of Germany . |
| 720245 | 4/1942 | Fed. Rep. of Germany . |
| 1808702 | 4/1970 | Fed. Rep. of Germany . |
| 1145368 | 5/1957 | France . |
| 1300315 | 6/1962 | France . |
| 1550058 | 11/1968 | France . |
| 1011202 | 11/1965 | United Kingdom ................ 280/700 |

OTHER PUBLICATIONS

Technische Automobilrundschau, Jul. 1975, vol. 30, pp. 52–54.

Primary Examiner—Joseph F. Peters, Jr.
Assistant Examiner—Kenneth R. Rice
Attorney, Agent, or Firm—Kurt Kelman

[57] ABSTRACT

The invention provides an improvement in an assembly comprising a frame for a motor vehicle, a pair of unsteered wheels disposed on opposite sides of the frame, and a spring suspension comprising a respective longitudinal control arm connected to each one of the wheels for constraining the wheel, each control arm having a hub, a respective bearing sleeve having one end secured to the frame and associated with a respective one of the control arms, the control arm hub being rotatably mounted in the associated bearing sleeve, the bearing sleeves having inner ends facing each other, a respective torsion bar associated with each wheel control arm for urging the control arm to a predetermined angular position about the axis of the associated bearing sleeve, the torsion bars having axes extending parallel to each other transversely to the direction of travel and the torsion bars being arranged one behind the other in this direction, and a respective anchor secured to the frame against rotation about the axis of an associated one of the torsion bars, one end of each torsion bar being fixed to the hub of the associated control arm and the other torsion bar end being fixed to the associated anchor. In the improvement, the anchors are concentrically mounted on the facing inner ends of the associated bearing sleeves and each anchor is a casting having a sprue eccentric with respect to the axis of the associated bearing sleeve, the other torsion bar ends being fixed in the eccentric sprues whereby the fixed other end of one torsion bar is offset from the fixed one end of the other torsion bar.

3 Claims, 4 Drawing Figures

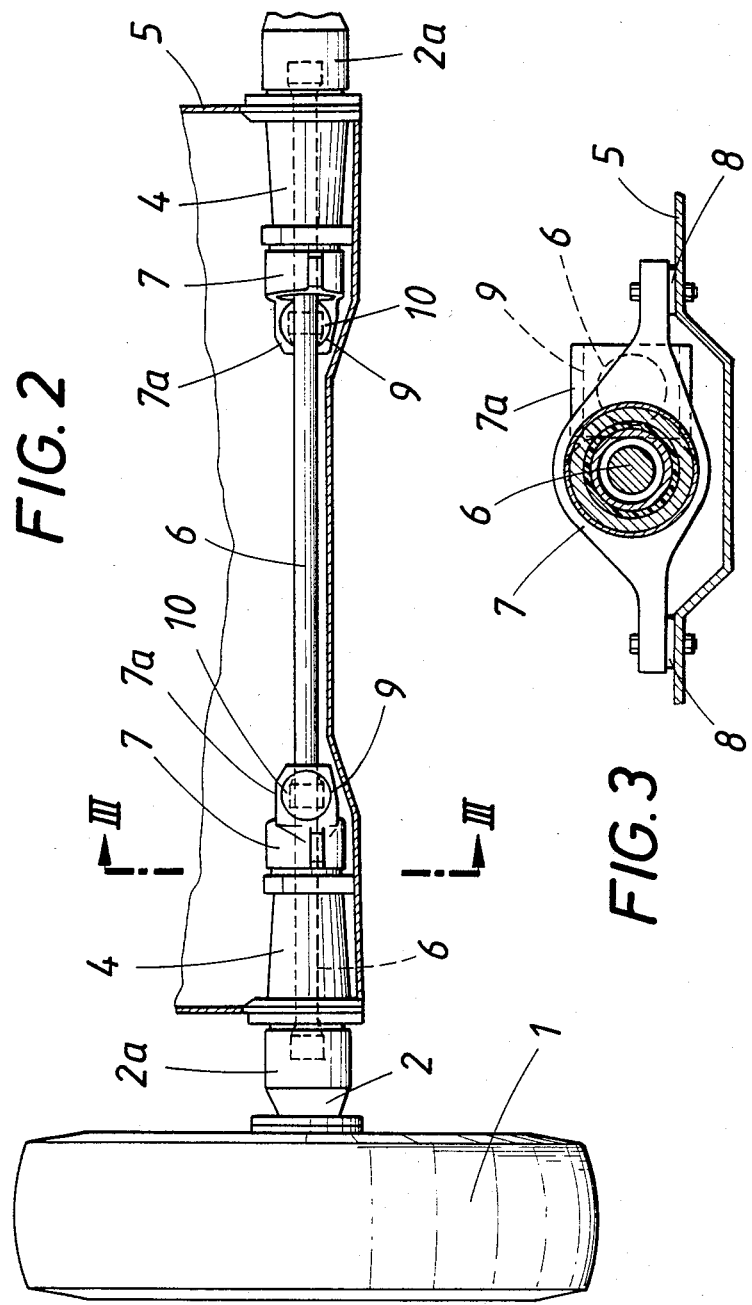

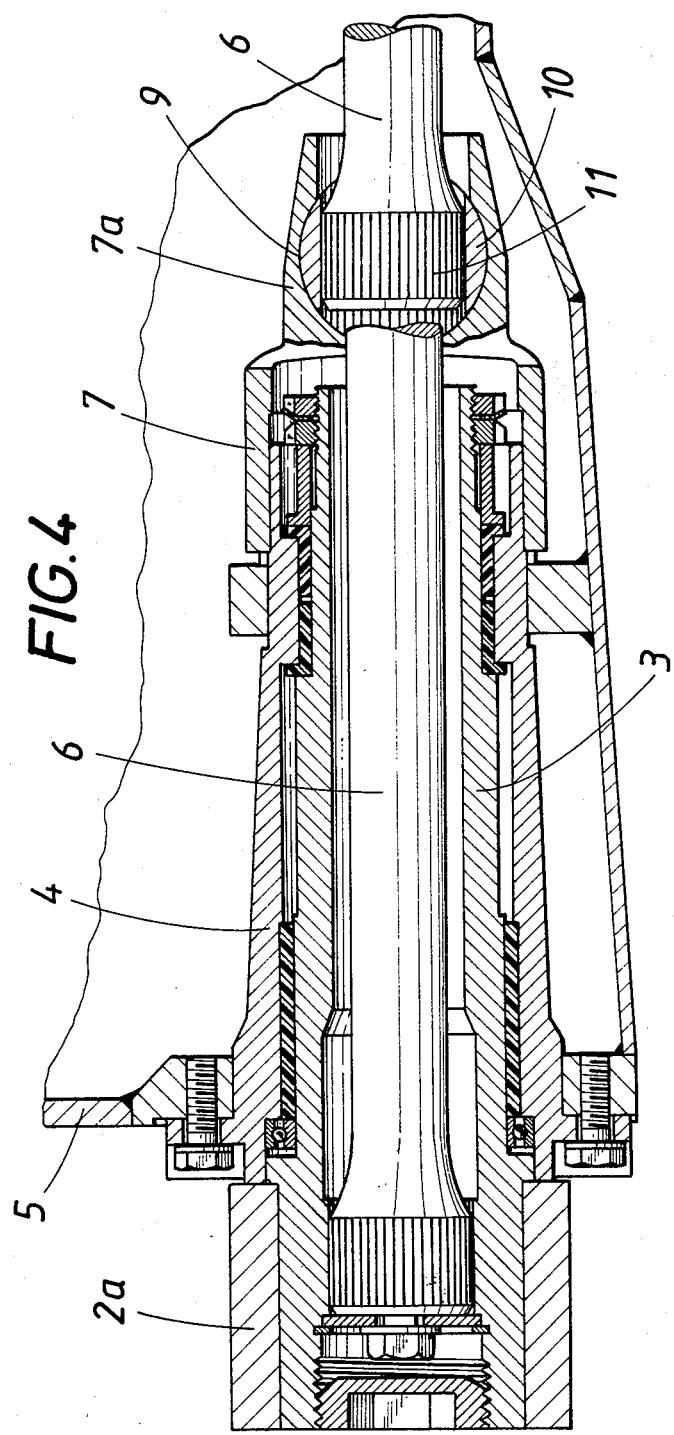

ASSEMBLY COMPRISING A FRAME, UNSTEERED WHEELS AND SPRING SUSPENSION OF A MOTOR VEHICLE

This invention relates to a spring suspension for motor vehicles wherein each of two unsteerable wheels of the vehicle is constrained by means of a longitudinal control arm, pivoted in a bearing sleeve that is secured to the frame of the vehicle, wherein the longitudinal control arm is pivotally movable against the force of a torsion bar, the two torsion bars associated with the two wheels are parallel to each other and extend transversely to the direction of travel of the vehicle and are spaced apart in that direction, and each of the torsion bars is secured at one end to a hub of the associated longitudinal control arm and at its other end in an associated anchor secured to the frame of the vehicle.

In a known chain-tracked vehicle of that kind, two undriven wheels are provided on opposite sides of the vehicle and are mounted on respective longitudinal arms. Each torsion bar extends from the interior of the hub of one longitudinal control arm transversely through the frame of the vehicle to the bearing sleeve associated with the opposite longitudinal control arm and in non-rotatably fitted in a mounting consisting of a socket of said bearing sleeve. A disadvantage of that arrangement resides in that the socket disposed beside the neck of the bearing sleeve must be eccentric with respect to that sleeve so that an undesirably large distance between the two associated torsion bars is required. In spring suspensions for two road wheels which are mounted on an axle of a wheeled vehicle and driven via universal-joint shafts, the fact that the articulated-joint shafts are not aligned involves excessively large angles at the articulated joints and this results in undesired noise and wear. Besides, the bearing sleeve comprising a neck and a socket extends through the wall of the vehicle frame in a large, approximately rectangular aperture in said wall so that the flange of the bearing sleeve and the wall surfaces contacted by said flange must be machined in large areas. The entire arrangement has a considerable space requirement and adds to the weight of the vehicle.

It is an object of the invention to eliminate these disadvantages and to provide a spring suspension which is of a kind described first hereinbefore and which particularly in wheeled vehicles having wheels driven via universal-joint shafts can be accommodated without a need for undesirably large angles at the universal joints. Besides, the arrangement should have a smaller space requirement and lower manufacturing costs.

This object is accomplished in accordance with the invention in that the anchors are non-rotatably supported directly or indirectly by the frame of the vehicle and are concentrically mounted on those free ends of the bearing sleeves which face the vertical longitudinal center plane of the vehicle.

Owing to the concentric mounting of the anchor for each torsion bar on the free end of the bearing sleeve in which a hub receiving the other torsion bar of the pair of torsion bars associated with an axle is mounted, that anchor may be arranged very close to the other torsion bar. For this reason the center spacing of said two torsion bars may be so small that a favorable design of the universal-joint shafts of the axle is permitted. The neck of the bearing sleeve may be fitted into the frame of the vehicle in a circular bore, which can easily be machined in a precise manner so that there is no need for a large and expensive flange for fixing the sleeve. Besides, it is not difficult to provide a second web for an improved and exact support for the neck of each bearing sleeve, which second web is fixed to the frame and receives the neck in a seat which can easily be machined together with the bore in the frame of the vehicle.

A particularly space-saving arrangement will be obtained in accordance with the invention if the anchor for the torsion bar associated with each wheel is non-rotatably connected to the bearing sleeve associated with the other wheel by a positive coupling, e.g., by splines.

Alternatively, the anchors for the torsion bars may be pivoted to the frame of the vehicle about the axis of the associated bearing sleeve and adapted to be fixed in an adjusted angular position by screws. In that case the anchors for the torsion bars may be pivotally moved to a desired angular position in dependence on an angular misalignment of the two torsion bars which are associated with each other. For this purpose, wedges may be inserted between a backing surface of the anchor and an opposite surface of the frame of the vehicle and may be secured by means of set screws.

According to a further preferred feature of the invention each torsion bar is provided with a torsion bar holder received in the associated anchor in a cylindrical bore which extends horizontally in the longitudinal direction of the vehicle. The known torsion bar holders used for that purpose have had a vertical axis so that the compensation of an angular misalignment in a horizontal plane of the two torsion bars associated with each other did not involve substantial bending stresses and the assembling was simplified. But it has been recognized that in vehicles of certain kinds in which the frame is substantially deformed in operation, this may result in an angular misalignment of the center lines of the two torsion bars or of the two associated bearing sleeves, particularly in a vertical transverse plane of the vehicle. These angular misalignments can be sufficiently compensated if the axis of the torsion bar holder has the orientation proposed by the invention.

An illustrative embodiment of the invention is shown on the accompanying drawing, in which FIG. 1 is a top plan view showing a spring suspension for two unsteered wheels (only one of which is shown) of a motor vehicle having a tub-shaped frame (shown in cross section), FIG. 2 is a corresponding side elevation, FIG. 3 is a transverse sectional view taken on line III—III in FIG. 2 and FIG. 4 is an enlarged longitudinal sectional view showing the bearing sleeve associated with a wheel of the vehicle.

Each of the two unsteered wheels 1 of a motor vehicle is constituted by means of a longitudinal control arm 2, which has a hub 2a non-rotatably fitted on a hollow pivot pin 3 (FIG. 4) rotatably mounted in a bearing sleeve 4. The bearing sleeves 4 are fixedly secured at one end to the tub-shaped frame 5 of the vehicle. A respective torsion bar 6, which extends transversely to the direction of travel of the vehicle, is associated with each longitudinal control arm 2. One end of each torsion bar is non-rotatably held in the pivot pin 3 on which hub 2a of the associated control arm 2 is non-rotatably fitted and at its other end is secured in an anchor 7. As shown in FIG. 1, the two torsion bars extend parallel to each other and are arranged one behind the other in the direction of travel of the vehicle. Each anchor 7 associated with one of the wheels 1 is concentrically mounted on the bearing sleeve 4 associated with the other wheel at the free end of said bearing sleeve 4, which free ends face each other. As shown in FIG. 3 each anchor is secured to the frame of the vehicle, particularly to the bottom of the tub-shaped frame 5 on opposite sides of the bearing sleeve 4 whereby a rotation about the axis of the associated torsion bar is prevented. Each anchor 7 may be pivoted on the axis of the associated bearing sleeve 4 and may be adapted to be held in a desired angular position, e.g., by means of shims 8, which may be wedged-shaped. Each anchor 7 consists of a casting, which has a sprue 7a formed with a horizontal cylindrical bore 9 extending in the direction of travel. A cylindrical torsion bar holder 10 is rotatably mounted in each bore 9 and is connected to the adjacent end of the associated torsion bar by splines 11, the anchor sprue being eccentric with respect to the axis of the associated bearing sleeve whereby the adjacent end of the associated torsion bar is offset from the axis. Each anchor 7 may also be connected to the associated bearing sleeve 4 by splines.

What is claimed is:

1. An assembly comprising a frame for a motor vehicle adapted to be driven in a direction of travel, a pair of unsteered wheels disposed on opposite sides of said frame, and a spring suspension comprising a respective longitudinal control arm connected to each one of the wheels for constraining the wheel, each control arm having a hub, a respective bearing sleeve having one end secured to the frame and associated with a respective one of the control arms, the control arm hub being rotatably mounted in the associated bearing sleeve, the bearing sleeves having inner ends facing each other, a respective torsion bar associated with each wheel control arm for urging said control arm to a predetermined angular position about the axis of the associated bearing sleeve and having two ends, the torsion bars having axes extending parallel to each other transversely to the direction of travel and the torsion bars being arranged one behind the other in said direction, and a respective anchor secured to said frame against rotation about the axis of an associated one of the torsion bars, one end of each torsion bar being fixed to the hub of the associated control arm and the other torsion bar end being fixed to be associated anchor, wherein the improvement comprises
    (a) the anchors being concentrically mounted on the facing inner ends of the associated bearing sleeves and
    (b) each anchor being a casting having a sprue eccentric with respect to the axis of the associated bearing sleeve, the other torsion bar ends being fixed in the eccentric sprues whereby the fixed other end of one torsion bar is offset from the fixed one end of the other torsion bar.

2. In the assembly of claim 1, each anchor for the other end of the torsion bar associated with one wheel control arm is angularly adjustably mounted on the bearing sleeve for the one end of the torsion bar associated with the other wheel control arm, and fixing means for fixing each anchor to the other bearing sleeve in an adjusted angular position.

3. In the assembly of claim 1, a cylindrical torsion bar holder fixing each other end of a respective one of the torsion bars to the associated anchor, each anchor defining a horizontal cylindrical bore extending in the direction of travel and receiving the torsion bar holder.

* * * * *